Patented June 22, 1937

2,084,555

UNITED STATES PATENT OFFICE 2,084,555

COLORED RUBBER PRODUCTS AND A PROCESS OF PRODUCING THEM

Ernst Fischer, Frankfort-on-the-Main, Germany, assignor to General Aniline Works, Inc., New York, N. Y., a corporation of Delaware No Drawing. Application February 21, 1935, Serial No. 7,639. In Germany February 27, 1934

5 Claims. (Cl. 18—50)

The present invention relates to colored rubber products and to a process of producing them.

I have found that rubber products (which term is meant to include natural rubber as well as the synthetic products which have a constitution and properties similar to those of natural rubber, as for example polymerization products of butadiene hydrocarbons such as butadiene or isoprene) can be colored clear orange to red-violet shades having very good fastness properties by incorporating with the rubber products or mixtures containing them, prior to vulcanization, water-insoluble monoazo-dyestuffs of the general formula:

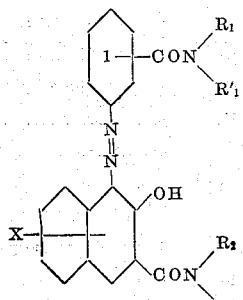

wherein the

group stands in one of the positions meta and para to the azo-group and the benzene nucleus 1 may contain further substituents such as, for instance, alkyl, alkoxy-, aryloxy-groups or halogen, X stands for hydrogen, halogen or alkoxy, $R_1$, $R'_1$, $R_2$ and $R'_2$ mean hydrogen, alkyl-, aryl-, aralkyl- or hydroaromatic radicals and wherein the radicals linked to the same nitrogen atom may further be connected with each other to form a heterocyclic ring system, $R_1$ and $R'_1$ being alkyl, aryl, aralkyl or hydroaromatic radicals in case $R_2$ (or $R'_2$) means hydrogen and $R'_2$ (or $R_2$) stands for an aryl radical.

By reason of the said dyestuffs being practically insoluble in rubber, they do not bleed when the rubber products are worked up; neither do they give rise to that phenomenon which is known as blushing or efflorescence when the rubber articles are stored. Furthermore, they are insoluble in benzine which renders them especially suitable also for being used in connection with cold vulcanization processes which are advantageously carried out in the presence of benzine.

The following examples serve to illustrate the invention, but they are not intended to limit it thereto; the parts are by weight:

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 1.5 parts of the dyestuff obtainable by coupling diazotized 1-amino-2-methylbenzene-5-(carbonyl-aminobenzene) with 2.3-hydroxynaphthoic acid-ethyl-amide. The mixture is vulcanized in a vulcanization press for 12 minutes at a steam pressure of 3 atmospheres above atmospheric pressure. There is obtained a bluish-red vulcanizate of very good fastness properties.

(2) A rubber mixture is prepared in the usual manner from crepe rubber, the usual admixtures and 1.5 parts of the dyestuff obtainable by coupling diazotized 1-amino-2-methoxybenzene-5-(carbonyl-aminobenzene) with 6-bromo-2.3-hydroxynaphthoyl-benzylamine. The mixture is vulcanized by immersing it for 8 seconds in a solution of 3 parts of sulfur chloride in 97 parts of benzine. The cold vulcanizate thus obtained is, as to its fastness properties, very similar to and somewhat more yellowish than that described in Example 1.

(3) A mixture is prepared from 100 parts of crepe rubber, 2.5 parts of sulfur, 0.35 part of thiuram, 5 parts of zinc white, 0.6 part of ozocerite, 0.5 part of stearic acid and 1.5 parts of the dyestuff obtainable by coupling diazotized 1-amino-2-methoxybenzene-5-(carbonyl-diphenylamine) with 2'3'-hydroxynaphthoyl-1-amino-3-nitrobenzene. The mass is vulcanized in an iron mould in a vulcanization press for 15 minutes at a super-atmospheric pressure of 2 atmospheres. There is thus obtained a clear, bluish-red vulcanizate of very good fastness properties.

(4) A rubber mixture is prepared in the usual manner from crepe rubber, the usual admixtures and 1.5 parts of the dyestuff obtainable by coupling diazotized 1-amino-2-methoxybenzene-5-carboxylic acid-benzylamide with 2.3-hydroxynaphthoyl-N-methyl-aminobenzene. The mixture is vulcanized by immersing it for 8 seconds in a solution of 3 parts of sulfur chloride in 97 parts of benzine. The cold bluish-red vulcanizate thus obtained is, as to its fastness properties, very similar to that described in Example 3.

The following table illustrates a series of dyestuffs which may be substituted for those of Examples 1 to 4 and which dye the vulcanizates very fast tints.

| | Diazo compound from | Coupled with | Shade |
|---|---|---|---|
| | | 2'3'-hydroxynaphthoyl: | |
| 1 | 1-amino-benzene-3-(carbonyl-4'-aminodiphenyl) | -amine | Red |
| 2 | 1-amino-benzene-4-(carbonyl-1'-amino-2'5'-dichlorobenzene.) | -amine | Red |
| 3 | 1-amino-4-phenoxybenzene-5-(carbonyl-1'-amino-2'-methoxybenzene). | -amine | Red |
| 4 | 1-amino-4-chlorobenzene-5-(carbonyl-diphenylamine) | -aminobenzene | Red |
| 5 | 1-amino-2-chlorobenzene-5-(carbonyl-1'-amino-2'-methoxy-4'-chlorobenzene). | -amine | Red |
| 6 | 1-amino-2-chlorobenzene-5-(carbonyl-diethylamine) | -aminobenzene | Red |
| 7 | 1-amino-2-chlorobenzene-5-(carbonyl-1'-amino-4'-methoxybenzene). | -N-methyl-aminobenzene. | Orange |
| 8 | 1-amino-2-methyl-benzene-5-(carbonyl-2'-amino-1'2'-3'4'-tetrahydronaphthalene). | -amine | Red |
| 9 | 1-amino-2-methyl-benzene-5-(carbonyl-1'-amino-4'-chlorobenzene). | -2-amino-1.2.3.4-tetrahydronaphthalene. | Red |
| 10 | 1-amino-2-methyl-benzene-5-(carbonyl-aminobenzene) | -amine | Red |
| 11 | 1-amino-2-methyl-benzene-5-(carbonyl-diphenylamine) | -aminobenzene | Red |
| 12 | 1-amino-2-methyl-benzene-5-(carbonyl-diphenylamine) | -2-aminonaphthalene | Red |
| 13 | 1-amino-2-methyl-benzene-5-(carbonyl-dibenzylamine) | -aminobenzene | Red |
| 14 | 1-amino-2-methyl-benzene-5-(carbonyl-N-methyl-amino-benzene). | -aminobenzene | Red |
| 15 | 1-amino-2-methyl-benzene-5-(carbonyl-1'-amino-2'5'-dichlorobenzene). | -N-diphenylamine | Red |
| 16 | 1-amino-2-methyl-benzene-5-(carbonyl-aminobenzene) | -N-piperidine | Yellowish-red |
| 17 | 1-amino-2-methyl-benzene-5-(carbonyl-aminobenzene) | -N-benzyl-cyclohexylamine. | Red |
| 18 | 1-amino-2-methoxy-benzene-5-carboxylic acid-benzyl-amide. | -amine | Red |
| 19 | 1-amino-2-methoxy-benzene-5-carboxylic acid-isobutylamide. | -amine | Red |
| 20 | 1-amino-2-methoxy-benzene-5-carboxylic acid-benzylamide. | -amine | Red |
| 21 | 1-amino-2-methoxy-benzene-5-carboxylic acid-benzylamide. | -N-methyl-aminobenzene. | Red |
| 22 | 1-amino-2-methoxy-benzene-5-carboxylic acid-cyclohexylamide. | -amine | Red |
| 23 | 1-amino-2-methoxy-benzene-5-(carbonyl-1'¹-amino-1'-methyl-naphthalene). | -amine | Bordo |
| 24 | 1-amino-2-methoxy-benzene-5-(carbonyl-2'¹-amino-2'-methyl-naphthalene). | -N-methyl-amino-benzene. | Red |
| 25 | 1-amino-2-methoxy-benzene-5-(carbonyl-aminobenzene) | -n-butylamine | Bordo |
| 26 | 1-amino-2-methoxy-benzene-5-(carbonyl-aminobenzene) | -cyclohexylamine | Bordo |
| 27 | 1-amino-2-methoxy-benzene-5-(carbonyl-2'-amino-naphthalene). | -benzylamine | Bordo |
| 28 | 1-amino-2-methoxy-benzene-5-(carbonyl-1'-amino-4'-methylbenzene). | -1¹-amino-1-methyl-naphthalene. | Red |
| 29 | 1-amino-2-methoxy-benzene-5-(carbonyl-1'-amino-3'-bromobenzene). | -amine | Red |
| 30 | 1-amino-2-methoxy-benzene-5-(carbonyl-2'-amino-5'6'7'8'-tetrahydro-naphthalene). | -amine | Red |
| 31 | 1-amino-2-methoxy-benzene-5-(carbonyl-1'-amino-4'-chlorobenzene). | -N-methyl-benzyl-amine | Red |
| 32 | 1-amino-2-methoxy-benzene-5-(carbonyl-aminobenzene). | -N-methyl-amino-benzene. | Red |
| 33 | 1-amino-2-methoxy-benzene-5-(carbonyl-N-methyl-benzylamine). | -1-amino-4-methoxy-benzene. | Red |
| 34 | 1-amino-2-methylbenzene-5-(carbonyl-N-benzyl-amino-benzene). | -1-amino-4-methyl-benzene. | Red |
| 35 | 1-amino-2-methoxy-benzene-5-(carbonyl-N-benzyl-cyclo-hexylamine). | -aminobenzene | Red |
| 36 | 1-amino-2-methoxy-benzene-5-(carbonyl-N-carbazole) | -1-amino-3-nitro-benzene | Red |
| 37 | 1-amino-2-methoxy-benzene-5-(carbonyl-N-phenyl-2'-aminonaphthalene). | -1-amino-3-nitro-benzene | Red |
| 38 | 1-amino-2-methoxy-benzene-5-(carbonyl-aminobenzene) | -N-cyclohexyl-amino-benzene. | Red |
| | | 6'-bromo-2'3'-hydroxynaphthoyl: | |
| 39 | 1-amino-benzene-3-(carbonyl-aminobenzene) | -benzylamine | Red |
| 40 | 1-amino-2-methyl-benzene-5-carboxylic acid-amide | -benzylamine | Red |
| 41 | 1-amino-2-methoxy-benzene-5-(carbonyl-2'¹-amino-2'-methyl-naphthalene). | -N-methyl-aminobenzene | Bordo |
| | | 6'-methoxy-2'3'-hydroxynaphthoyl: | |
| 42 | 1-amino-2-methyl-benzene-5-carboxylic acid-amide | -benzylamine | Red |
| 43 | 1-amino-2-methoxy-benzene-5-(carbonyl-1'-amino-4'-chlorobenzene). | -benzylamine | Bordo |

I claim:

1. The process of producing colored rubber products which comprises mixing a rubber product with a water-insoluble mono-azo-dyestuff corresponding to the following general formula:

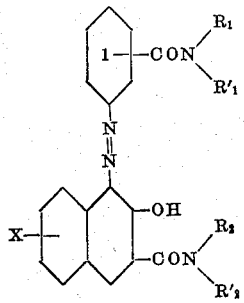

wherein the

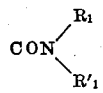

-group stands in one of the positions meta and para to the azo-group and the benzene nucleus 1 may be substituted by alkyl-, alkoxy-, aryloxy- groups or halogen, X stands for hydrogen, halogen or alkoxy, $R_1$, $R'_1$, $R_2$ and $R'_2$ mean hydrogen, alkyl-, aryl-, aralkyl- or hydroaromatic radicals and wherein the radicals linked to the same nitrogen atom may further be connected with each other to form a heterocyclic ring system, $R_1$ and $R'_1$ being selected from the class of alkyl, aryl, aralkyl and hydroaromatic in the event that $R_2$ is hydrogen and $R'_2$ is aryl and then vulcanizing the mixture.

2. Colored rubber products containing a water-insoluble mono-azo-dyestuff of the following general formula:

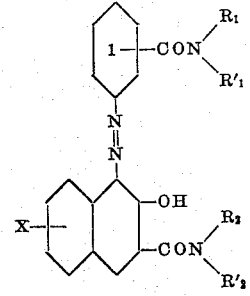

wherein the

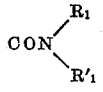

-group stands in one of the positions meta and para to the azo-group and the benzene nucleus 1 may be substituted by alkyl-, alkoxy-, aryloxy- groups or halogen, X stands for hydrogen, halogen or alkoxy, $R_1$, $R'_1$, $R_2$ and $R'_2$ mean hydrogen, alkyl-, aryl-, aralkyl- or hydroaromatic radicals and wherein the radicals linked to the same nitrogen atom may further be connected with each other to form a heterocyclic ring system, $R_1$ and $R'_1$ being selected from the class of alkyl, aryl, aralkyl and hydroaromatic in the event that $R_2$ is hydrogen and $R'_2$ is aryl.

3. Colored rubber products containing a water-insoluble monoazo-dyestuff of the following formula:

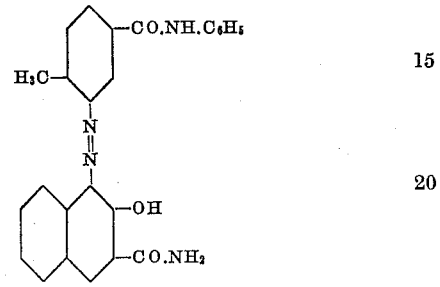

4. Colored rubber products containing a water-insoluble mono-azo-dyestuff of the following formula:

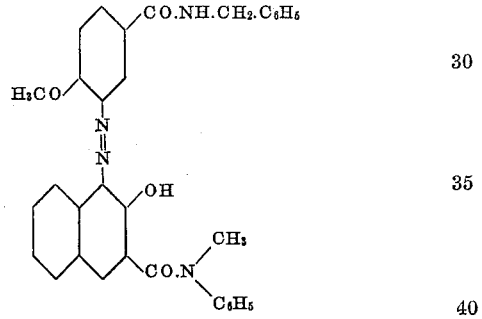

5. Colored rubber products containing a water-insoluble mono-azo-dyestuff of the following formula:

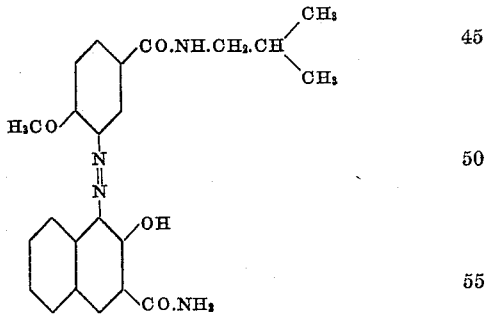

ERNST FISCHER.